Jan. 16, 1962 R. F. KOLEC 3,017,052
RIVETING TOOL
Filed Jan. 10, 1958
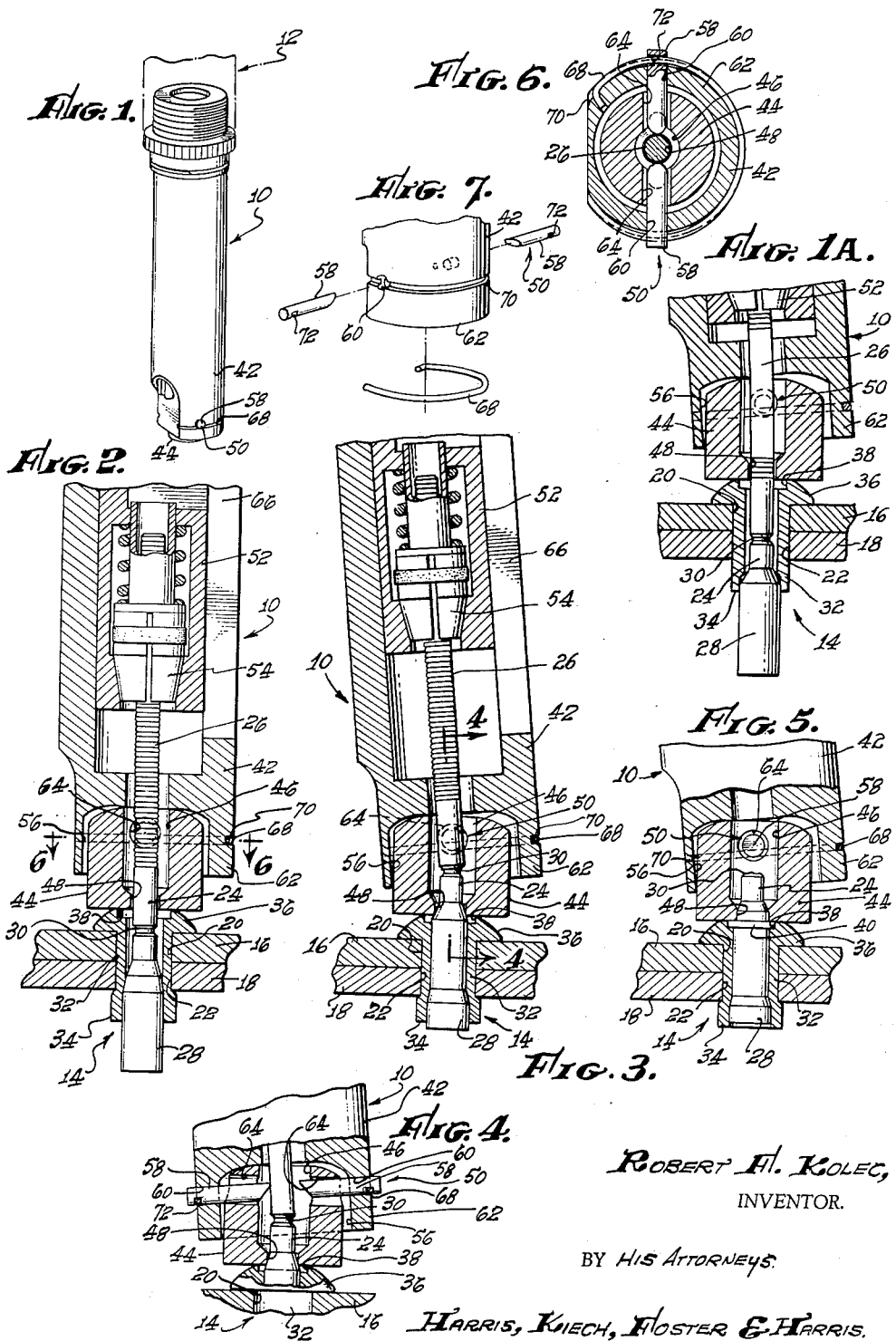
Robert F. Kolec,
INVENTOR.
BY HIS ATTORNEYS
Harris, Kiech, Foster & Harris.

the tubular rivet.

United States Patent Office 3,017,052
Patented Jan. 16, 1962

3,017,052
RIVETING TOOL
Robert F. Kolec, Whittier, Calif., assignor to Olympic Screw & Rivet Corporation, Downey, Calif., a corporation of California
Filed Jan. 10, 1958, Ser. No. 708,094
5 Claims. (Cl. 218—42)

The present invention relates in general to riveting tools, and, more particularly, to a riveting tool of the type employed for setting blind rivet assemblies, wherein the riveting forces are all applied from one side of the work. Blind rivet assemblies are widely utilized in locations where the work is accessible from one side only, although they may be used in other locations also if desired.

A rivet assembly to be set with the riveting tool of the present invention includes a tubular rivet having a head and a tail and includes a stem extending through the tubular rivet and projecting from the ends thereof. This stem is provided adjacent the tail of the tubular rivet with a tail flaring means which expands or flares the tail of the rivet outwardly to set it in response to axial movement of the stem relative to the rivet. Such a rivet assembly is set by a riveting tool which includes a pressure member having a pressure nose engageable with the head of the tubular rivet to hold it in place as the stem is moved axially to flare the tail of the rivet. In order to move the stem axially, it is provided adjacent the head of the tubular rivet with grippable means engageable by a gripping means on a pulling member of the riveting tool which is movable axially relative to the pressure member. Thus, when a rivet assembly of this nature is set by means of a riveting tool of the character described, the gripping means on the pulling member of the tool takes hold of the grippable means on the stem of the rivet assembly adjacent the head of the tubular rivet and pulls the stem of the rivet assembly axially of the tubular rivet so that the tail flaring means on the stem adjacent the tail of the tubular rivet flares the tail of the tubular rivet outwardly to set it, thereby clamping the work between the head of the tubular rivet and the outwardly flared tail thereof.

In some instances, the stem of the rivet assembly is pulled completely through the tubular rivet, although it is preferable to lock the stem within the tubular rivet to strengthen same. The stem may be locked in place in the expanded or set tubular rivet by employing as the tail flaring means, or as a part of the tail flaring means, a shaveable shank which is of larger diameter than the stem, the pressure nose of the riveting tool in this case being a die having an axial hole or orifice which shaves material from the shank into an annular recess in the head of the tubular rivet as the shank is drawn through the rivet. This procedure of shaving material from the enlarged shank of the stem into the annular recess in the head of the tubular rivet positively locks the stem within the tubular rivet, as more fully disclosed in my copending application Serial No. 501,637, filed April 15, 1955, and now abandoned, and in copending application Serial No. 668,260, filed June 26, 1957 by Harry S. Brenner and me jointly.

In setting rivet assemblies of the foregoing nature with conventional riveting tools, the rivet assemblies are frequently set with their axes cocked or inclined relative to the desired orientations thereof because of the fact that the riveter inadvertently or through necessity because of the presence of obstructions, cocks or inclines the axis of the riveting tool with respect to the axes of the holes through the work in which the rivet assemblies are disposed. Also, in connection with the rivet assembly wherein material is shaved from the enlarged shank into the annular recess in the head of the tubular rivet, such cocking of the riveting tool frequently results in shaving of the shank on one side thereof only, or at least in non-uniform shaving of the shank circumferentially thereof, thereby producing a defective lock between the stem and the tubular rivet.

A primary object of the invention is to eliminate the foregoing disadvantages of prior riveting tools by providing a tool which will cause the axis of the rivet assembly to coincide with the axis of the holes through the work, and which will shave uniformly the shank of a rivet assembly of the type wherein the stem is locked relative to the tubular rivet by shaving, even though the axis of the riveting tool may be cocked at a substantial angle relative to the axis of the holes through the work, whether such cocking is accidental, or deliberate due to the relative inaccessibility of the rivet assembly being set.

More particularly, an important object of the invention is to provide a universal joint means connecting the pressure nose or shaving die of the riveting tool to the pressure member thereof, whereby the axis of the pressure member may be shifted, e.g., cocked, relative to the axis of the pressure nose or shaving die to a substantial extent without shifting the axis of the pressure nose or shaving die relative to the axis of the rivet assembly and the axis of the holes through the work.

Another object is to provide such a universal joint means which includes check means for preventing movement of the stem of the rivet assembly axially outwardly through the hole or orifice in the pressure nose or shaving die so that, in instances where the stem is broken off after setting the rivet assembly, such check means insures that the broken portion of the stem will be discharged through a discharge passage in the riveting tool by preventing reverse movement thereof outwardly through the hole or orifice in the pressure nose or shaving die. In other words, the check means incorporated in the universal joint means holds the broken portion of the stem so that such broken portion is ejected through the discharge passage in the riveting tool by the stem of the next rivet assembly set by the tool.

A further object of the invention is to provide a universal joint means which includes two transversely spaced, transversely extending pins carried by the pressure member and extending into enlarged, transversely spaced, transversely extending holes in the pressure nose or shaving die. This construction permits the pressure nose or shaving die to wobble and shift laterally relative to the pressure member in all directions to provide a universal-joint type of connection between these elements of the riveting tool.

Another object is to provide a tool wherein the pins mentioned are movable transversely outwardly from positions wherein the inner ends thereof are spaced apart a distance less than the diameter of the stem of the rivet assembly, the check means mentioned including resilient means for biasing the pins transversely inwardly to cause the inner ends thereof to releasably grip the stem of the rivet assembly so that the pins retain the portion of the stem which is broken off, whereby insertion of the stem of a subsequent rivet assembly through the axial hole or orifice in the pressure nose or shaving die moves the broken portion of the stem of the preceding rivet assembly through the discharge passage in the riveting tool.

Another object is to provide means for limiting inward movement of the pins under the influence of the resilient means mentioned.

The foregoing objects, advantages, features and results of the present invention, together with various other objects, advantages, features and results thereof which will be evident to those skilled in the riveting art in the light of this disclosure, may be attained with the exemplary embodiment of the invention illustrated in the accompanying drawing and described in detail hereinafter.

In the drawing:

FIG. 1 is a perspective view of a riveting or pulling head of the riveting tool of the invention;

FIG. 1A is an enlarged, fragmentary sectional view illustrating the operation of the invention when the axis of the riveting tool does not coincide with the axis of the rivet assembly and the axis of the holes through the work in which the rivet assembly is disposed, the foregoing being shown prior to initiating operation of the riveting tool, and the axis of the riveting tool being shown cocked, relative to the axis of the rivet assembly and the axis of the holes through the work, to an exaggerated degree for clarity;

FIG. 2 is an enlarged, fragmentary sectional view illustrating the operation of the invention when the axis of the riveting tool coincides with the axis of the rivet assembly and the axis of the holes through the work in which the rivet assembly is disposed;

FIGS. 3 and 4 and 5 are fragmentary sectional views generally similar to FIG. 2, but showing the axis of the riveting tool cocked, to an exaggerated degree for clarity, relative to the axis of the rivet assembly and the axis of the holes through the work, FIGS. 2, 3 and 5 being views in the same plane, and FIG. 4 being a view in a plane at right angles to the plane of FIGS. 2, 3 and 5, as indicated by the arrowed line 4—4 of FIG. 3;

FIG. 6 is a transverse sectional view taken along the arrowed line 6—6 of FIG. 2; and FIG. 7 is a fragmentary exploded perspective view of the universal joint means and check means of the invention.

Referring to the drawing, the numeral 10 designates a riveting tool of the invention which is operable by an actuator 12 of any suitable type, the actuator being energized pneumatically, hydraulically, electrically, or otherwise. The riveting tool 10 is shown in conjunction with a rivet assembly 14 like that disclosed in the aforementioned copending application Serial No. 668,260. For convenience, this rivet assembly will be described briefly before considering the riveting tool 10 itself.

The rivet assembly 14 is shown in conjunction with two sheets 16 and 18 respectively having holes 20 and 22 therein through which the rivet assembly is inserted, the rivet assembly clamping the two sheets together after setting thereof. The rivet assembly 14 includes a stem 24 having at one end a grippable means 26 and having at its other end a tail flaring means in the form of an enlarged, shaveable shank 28, there being a breakneck 30 between the grippable means and the shank which is designed to snap when the stem is tensioned sufficiently. The stem 24 carries a tubular rivet 32 having a tail 34 and a head 36 provided therein with an annular recess 38 adapted to be filled with material 40 shaved from the shank 28, as shown in FIG. 5. Initially, the tubular rivet 32 is disposed on the stem 24 between the grippable means 26 and the shank 28 with the tail 34 adjacent the shank and with the head 36 adjacent the grippable means. In FIG. 2 of the drawing, the shank 28 is shown as having been drawn part way through the tubular rivet 32, one end of the shank having been drawn completely through the tubular rivet in FIG. 3 and the operation of shaving material into the recess 38 in the head 36 having been initiated. In FIGS. 4 and 5, the recess 38 is shown as completely filled with the shaved material 40 to complete the operation of setting the rivet assembly 14, the stem 24 being shown as having been snapped off at the breakneck 30 in FIG. 5. Under the conditions shown in FIG. 5, the tubular rivet 32 clamps the sheets 16 and 18 together between the head 36 and the flared tail 34, while the shank 28 of the stem 24 is locked in place by the shaved material 40 and by the end thereof within the flared tail. The excess portion of the stem 24 between the shaved material 40 and the point where the stem was snapped off may be removed by machining, grinding, or the like, to render the end of the stem flush with the head 36 of the tubular rivet 32.

Considering the riveting tool 10 itself, it includes an outer, pressure member 42, a pressure nose or shaving die 44 having an axial opening 46 which includes a shaving orifice 48 of a diameter less than the initial diameter of the shank 28 so that it shaves the material 40 into the recess 38 in the head 36, universal joint means 50 connecting the shaving die to the pressure member so that the axis of the pressure member may shift relative to the axis of the shaving die, a pulling member 52 within and movable axially of the pressure member by the actuator 12, and gripping means 54 on the pulling member and engageable with the grippable means 26 on the stem 24 to pull the shank 28 through the tubular rivet 32.

The pressure nose or shaving die 44 is disposed in an enlarged axial cavity 56 in the nose of the pressure member 42 and is permitted to wobble and shift laterally therein in all directions by the universal joint means 50. The latter includes two transversely extending, transversely spaced pins 58 which are transversely slidable in transverse holes 60 in a skirt 62 of the pressure member 42 which surrounds the cavity 56. The pins 58 extend into the axial opening 46 in the shaving die 44 through transversely spaced, transversely extending holes 64 in the shaving die which are enlarged relative to the pins so that the shaving die may wobble and shift laterally in all directions relative to the pressure member. As shown in FIGS. 3, 4 and 5 of the drawing, even though the riveting tool 10 is cocked or shifted laterally to such an extent that the axis of the pressure and pulling members 42 and 52 is considerably out of alignment with the axis of the rivet assembly 14 and the axis of the holes 20 and 22, this does not result in displacement of the axis of the rivet assembly out of coincidence with the axis of the holes 20 and 22. Consequently, no cocking of the rivet assembly 14 relative to the work occurs, and uniform shaving of the shank 28 is obtained circumferentially of the shank, due to the fact that the universal joint means 50 prevents transmission of any cocking of the pressure and pulling members 42 and 52 to the shaving die 44, the axis of the latter remaining in coincidence with the axis of the rivet assembly 14 and the axis of the holes 20 and 22.

The inner ends of the pins 58 are beveled to provide therebetween a passage which converges in a direction away from the shaving orifice 48. The inner ends of the pins 58 are normally spaced apart a distance less than the diameter of the stem 24 of the rivet assembly 14 so that these pins act as a check means tending to prevent movement of the portion of the stem which is broken off by snapping at the breakneck 30 from moving axially outwardly through the shaving die 44, such broken portion of the stem being forced through the gripping means 54 and out through a discharge passage 66 in the tool 10 by insertion of the stem of a subsequent rivet assembly to be set through the shaving die 44 and into the gripping means. The convergence of the inner ends of the pins 58 away from the shaving orifice 48 permits the stem 24 to cam the transverse pins apart so that the stem may pass through the space between the pins and into the gripping means 54.

The pins 58 are biased inwardly into reverse-movement-checking engagement with the stem 24 by a horseshoe spring 68 which partially encircles the pressure member 42 and is disposed in a groove 70 therein. End portions of the spring 68 are disposed in notches 72 in the pins 58 to enable the spring to bias the pins inwardly, and to prevent the pins from becoming disengaged from the pressure member 42. The bottom of the groove 70 serves as a stop means for limiting inward movement of the end portions of the spring 68, thereby limiting inward movement of the transverse pins 58 toward each other under the influence of the spring.

Considering the over-all operation of the riveting tool 10 of the invention, after the rivet assembly 14 has been inserted in the holes 20 and 22 through the sheets 16 and 18, the riveting tool is placed over the stem 24 so that the grippable means 26 on the stem passes through the shaving orifice 48 into engagement with the gripping means 54 on the pulling member 52, thereby ejecting through the discharge passage 66 any broken portion of the stem from a previously set rivet assembly. It will be noted that the spring 68 causes the pins 58 to prevent reverse movement of such broken stem portion, the spring also permitting outward movement of the pins away from each other to permit insertion of the grippable means 26 on the next stem 24 into the gripping means 54. An alternative procedure to the foregoing is to insert the grippable means 26 on the stem 24 through the shaving orifice 48, between the pins 58 and into engagement with the gripping means 54 before inserting the rivet assembly 14 through the holes 20 and 22, the riveting tool 10 under such circumstances being utilized as the means for making this insertion through the holes 20 and 22.

As clearly shown in FIGS. 1A and 2 to 5 of the drawing, it is immaterial whether the riveting tool 10 to be held with the axis of the pressure and pulling members 42 and 52 in coincidence with the axis of the holes 20 and 22, or whether the axis of the pressure and pulling members be cocked and/or shifted laterally relative to the axis of the holes 20 and 22, the universal joint means 50 interconnecting the pressure member and the shaving die 44 permitting the axis of the shaving die 44, and thus the axis of the rivet assembly 14, to coincide with the axis of the holes 20 and 22 despite substantial shifting of the axis of the pressure and pulling members relative to the axis of the holes. Consequently, no cocking of the rivet assembly 14 relative to the work occurs as the rivet assembly is set. Also, material is shaved from the enlarged shank 28 of the stem 24 uniformly so as to insure complete and uniform filling of the annular recess 38 in the rivet head 36.

Another advantage of the present invention is that it permits substitution of another shaving die for the shaving die 44 readily, something which is impossible with prior riveting tools wherein the shaving dies are integral parts of or are permanently secured to the pressure member 42. Thus, the riveting tool 10 may be utilized in conjunction with rivet assemblies of different sizes merely by switching shaving dies.

Although an exemplary embodiment of the invention has been disclosed herein for purposes of illustration, it will be understood that various changes, modifications and substitutions may be incorporated in such embodiment without departing from the spirit of the invention as defined by the claims which follow:

I claim:

1. In a riveting tool for use with a rivet assembly which includes a stem having axially spaced tail flaring means and grippable means and which includes a tubular rivet on the stem and having a tail adjacent the tail flaring means and a head adjacent the grippable means, the combination of: a pressure member having an axis; a pressure nose having an end engageable with the head and having an axis and having an axial hole therethrough for the stem; universal joint means connecting said pressure nose to said pressure member, whereby the axis of said pressure member may shift relative to the axis of said pressure nose, said universal joint means providing an axial passage therethrough for the stem; a pulling member movable axially of said pressure member on the opposite side of said universal joint means from said pressure nose end; and gripping means on said pulling member and engageable with the grippable means on the stem upon insertion of the grippable means on the stem through said axial hole and said axial passage.

2. In a riveting tool for use with a rivet assembly which includes a stem having axially spaced tail flaring means and grippable means and which includes a tubular rivet on the stem and having a tail adjacent the tail flaring means and a head adjacent the grippable means, the combination of: a pressure member having an axis; a pressure nose having an end engageable with the head and having an axis and having an axial hole therethrough for the stem; universal joint means connecting said pressure nose to said pressure member, whereby the axis of said pressure member may shift relative to the axis of said pressure nose, said universal joint means including two transversely spaced, transversely extending pins carried by said pressure member and respectively disposed in enlarged, transversely spaced, transversely extending holes in the other, said pins providing therebetween an axial passage for the stem through said universal joint means which communicates with said axial hole; a pulling member movable axially of said pressure member on the opposite side of said universal joint means from said pressure nose end; and gripping means on said pulling member and engageable with the grippable means on the stem upon insertion of the grippable means on the stem through said axial hole and said axial passage.

3. In a riveting tool for use with a rivet assembly which includes a stem having axially spaced tail flaring means and grippable means and which includes a tubular rivet on the stem and having a tail adjacent the tail flaring means and a head adjacent the grippable means, the combination of: a pressure member having an axis; a pressure nose having an end engageable with the head and having an axis and having an axial hole therethrough for the stem; universal joint means connecting said pressure nose to said pressure member, whereby the axis of said pressure member may shift relative to the axis of said pressure nose, said universal joint means including two transversely spaced, transversely extending pins carried by said pressure member and respectively disposed in enlarged, transversely spaced, transversely extending holes in said pressure nose, said pins providing therebetween an axial passage for the stem through said universal joint means which communicates with said axial hole; a pulling member movable axially of said pressure member on the opposite side of said universal joint means from said pressure nose end; and gripping means on said pulling member and engageable with the grippable means on the stem upon insertion of the grippable means on the stem through said axial hole and said axial passage.

4. In a riveting tool for use with a rivet assembly which includes a stem having axially spaced tail flaring means and grippable means and which includes a tubular rivet on the stem and having a tail adjacent the tail flaring means and a head adjacent the grippable means, the combination of: a pressure member having an axis; a pressure nose having an end engageable with the head and having an axis and having an axial hole therethrough for the stem; universal means connecting said pressure nose to said pressure member, whereby the axis of said pressure member may shift relative to the axis of said pressure nose, said universal joint means including two transversely spaced, transversely extending pins carried by said pressure member and respectively disposed in enlarged, transversely spaced, transversely extending holes in said pressure nose, said pins providing therebetween an axial passage for the stem through said universal joint means which communicates with said axial hole, said pins being movable transversely of and outwardly relative to said pressure member from positions wherein the inner ends thereof are spaced apart a distance less than the diameter of the stem so that said pins tend to grip the stem; resilient means for biasing said pins inwardly toward said positions; stop means preventing inward movement of said pins beyond said positions; a pulling member movable axially of said pressure member on the opposite side of said universal joint means from said pressure nose end; and gripping means on said pulling member and engageable with the grippable means on the stem upon insertion of the grippable means on the stem through said axial hole and said axial passage.

5. In combination: a pressure member having an axis; a pressure nose having an end and having an axis and having an axial hole therethrough; universal joint means connecting said pressure nose to said pressure member so that the axis of said pressure member may shift relative to the axis of said pressure nose, said universal joint means including two transversely spaced, transversely extending pins carried by said pressure member and respectively extending through enlarged, transversely spaced, transversely extending holes in said pressure nose into said axial hole through said pressure nose, said pins providing therebetween an axial passage through said universal joint means which communicates with said axial hole; resilient means biasing said pins transversely inwardly toward each other; stop means limiting transverse inward movement of said pins toward each other; a pulling member movable axially of said pressure member on the opposite side of said universal joint means from said pressure nose end; and gripping means on said pulling member.

References Cited in the file of this patent

UNITED STATES PATENTS

| | | |
|---|---|---|
| 792,536 | Moran | June 13, 1905 |
| 1,294,583 | Whisler | Feb. 18, 1919 |
| 1,334,154 | Harrison | Mar. 16, 1920 |
| 1,392,220 | Quint | Sept. 27, 1921 |
| 2,153,415 | Fett et al. | Apr. 4, 1939 |
| 2,381,102 | Boyd | Aug. 7, 1945 |
| 2,396,001 | Fischer | Mar. 5, 1946 |
| 2,467,610 | Cherry | Apr. 19, 1949 |
| 2,648,207 | Quinn | Aug. 11, 1953 |
| 2,794,567 | Stau et al. | June 4, 1957 |
| 2,820,566 | Van Hecke | Jan. 21, 1958 |
| 2,931,532 | Gapp | Apr. 5, 1960 |

UNITED STATES PATENT OFFICE

CERTIFICATE OF CORRECTION

Patent No. 3,017,052 January 16, 1962

Robert F. Kolec

It is hereby certified that error appears in the above numbered patent requiring correction and that the said Letters Patent should read as corrected below.

Column 5, line 22, strike out "to"; column 6, line 53, after "universal" insert -- joint --.

Signed and sealed this 1st day of May 1962.

(SEAL)
Attest:

ERNEST W. SWIDER
Attesting Officer

DAVID L. LADD
Commissioner of Patents